United States Patent
Guo et al.

(10) Patent No.: US 11,881,916 B2
(45) Date of Patent: Jan. 23, 2024

(54) PRECODING METHOD AND APPARATUS

(71) Applicant: Huawei Technologies Co., Ltd., Guangdong (CN)

(72) Inventors: Senbao Guo, Xi'an (CN); Guibao Li, Xi'an (CN); Zhiying Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 187 days.

(21) Appl. No.: 17/643,997

(22) Filed: Dec. 13, 2021

(65) Prior Publication Data

US 2022/0103212 A1 Mar. 31, 2022

Related U.S. Application Data

(63) Continuation of application No. PCT/CN2020/091271, filed on May 20, 2020.

(30) Foreign Application Priority Data

Jun. 27, 2019 (CN) .......................... 201910567028.6

(51) Int. Cl.
H04B 7/0456 (2017.01)
H04W 52/36 (2009.01)

(52) U.S. Cl.
CPC ........ *H04B 7/0456* (2013.01); *H04W 52/367* (2013.01)

(58) Field of Classification Search
CPC .. H04B 7/0456; H04B 7/0426; H04B 7/0452; H04W 52/367; H04W 52/42
See application file for complete search history.

(56) References Cited

U.S. PATENT DOCUMENTS

2005/0136841 A1* 6/2005 Frank .................... H04W 52/42
  455/65
2010/0207762 A1* 8/2010 Lee ........................ G06V 20/52
  340/541
(Continued)

FOREIGN PATENT DOCUMENTS

CN 103582101 A 2/2014
CN 105430734 A 3/2016
(Continued)

OTHER PUBLICATIONS

Nortel, Differential Codebook for LTE Downlink Closed-Loop MIMO. 3GPP TSG-Ran Working Group 1 Meeting #47bis, Sorrento, Italy, Jan. 15-19, 2007, R1-070458, 8 pages.
(Continued)

*Primary Examiner* — Sung S Ahn
(74) *Attorney, Agent, or Firm* — WOMBLE BOND DICKINSON (US) LLP

(57) ABSTRACT

This application provides a precoding method and an apparatus for improving a power utilization of antennas. The method includes: determining a generalized inverse matrix $H_m^+$ of a channel value matrix $H_m$ of K users in an $m^{th}$ iteration in J iteration operations, where m=1, 2, ..., and J, $1 \leq J \leq M-K+1$, and M is a quantity of antennas; selecting, from a set $S1_{m-1}$ based on $H_m^+$, an antenna index $n_m$ and an update coefficient $\alpha_m$ corresponding to $n_m$, where $S1_{m-1}$ is a set of n unselected in antenna indexes n of the M antennas until an $(m-1)^{th}$ iteration ends; determining a weight matrix $W_m$ based on $H_m^+$ and $\alpha_m$; and assigning a row in $W_m$ and corresponding to $n_m$ to a row in a final weight matrix $W_{opt}$ and corresponding to $n_m$, where $W_{opt}$ is to adjust transmit powers of at least J of the M antennas to a preset maximum transmit power P after the J iteration operations end.

20 Claims, 6 Drawing Sheets

(56) References Cited

U.S. PATENT DOCUMENTS

2015/0124765 A1* 5/2015 Rong ................ H04W 72/0473
370/329
2018/0288709 A1 10/2018 Yao et al.

FOREIGN PATENT DOCUMENTS

| CN | 107171712 A | 9/2017 |
| CN | 107710838 A | 2/2018 |
| CN | 108683440 A | 10/2018 |
| EP | 2863689 A1 | 4/2015 |
| EP | 3499785 A1 | 6/2019 |

OTHER PUBLICATIONS

Li Wei et al: "An efficient joint userand antenna selection for MIMO broadcastcommunications using Generalized ZeroForcing precoder",Sep. 13, 2009, 1312-1316, XP031659536,total 5 pages.

* cited by examiner

PRECODING METHOD AND APPARATUS

CROSS-REFERENCE TO RELATED APPLICATIONS

This application is a continuation of International Application No. PCT/CN2020/091271, filed on May 20, 2020, which claims priority to Chinese Patent Application No. 201910567028.6, filed on Jun. 27, 2019. The disclosures of the aforementioned applications are hereby incorporated by reference in their entireties.

TECHNICAL FIELD

This application relates to the field of communication technologies, and in particular, to a precoding method and an apparatus.

BACKGROUND

In a multi-antenna multi-user transmission system, to avoid impact on orthogonality between a plurality of users caused when a transmit power of an antenna exceeds a maximum value, a base station generally performs maximum transmit power normalization processing on transmit powers of a plurality of antennas by using a power-limited eigenvector beamforming (PEBF) algorithm. That is, initial transmit powers of the plurality of antennas are divided by a transmit power of an antenna with a largest transmit power in the plurality of antennas. In this way, transmit powers of all the antennas except the antenna with the largest transmit power are reduced, which reduces a power utilization of the antennas, and results in a problem of power waste.

SUMMARY

This application provides a precoding method and an apparatus, to improve a power utilization of antennas.

According to a first aspect, an embodiment of this application provides a precoding method, including: determining a generalized inverse matrix $H_m^+$ of a channel value matrix $H_m$ of K users in an $m^{th}$ iteration in J iteration operations, where m=1, 2, . . . , and J, 1≤J≤M−K+1, J is an integer, and M is a quantity of antennas; selecting, from a set $S1_{m\text{-}1}$ based on $H_m$, an antenna index $n_m$ and an update coefficient $\alpha_m$ corresponding to $n_m$, where $S1_{m\text{-}1}$ is a set of n unselected in antenna indexes n of the M antennas until an $(m-1)^{th}$ iteration ends; determining a weight matrix $W_m$ based on $H_m^+$ and $\alpha_m$; and assigning a row that is in $W_m$ and that corresponds to $n_m$ to a row that is in a final weight matrix $W_{opt}$ and that corresponds to $n_m$, where $W_{opt}$ is used to adjust transmit powers of at least J of the M antennas to a preset maximum transmit power P after the J iteration operations end.

According to the precoding method provided in this application, $W_{opt}$ obtained through the J iteration operations can adjust the transmit powers of the at least J of the M antennas to the preset maximum transmit power P, thereby improving a power utilization of the M antennas.

In an embodiment, a product of $H_m$ and $W_m$ is a diagonal matrix or approximates to a diagonal matrix.

In an embodiment, the obtained $W_{opt}$ can ensure orthogonality between the plurality of users.

In an embodiment, the determining a weight matrix $W_m$ based on $H_m^+$ and $\alpha_m$ includes: calculating $W_m$ by using a formula $W_m = W_{m-1} + \alpha_m H_m^+$, where $W_{m-1}$ is a weight matrix used in the $(m-1)^{th}$ iteration.

In an embodiment, when m is greater than 2, the determining $H_m^+$ of $H_m$ of K users includes: calculating $H_m^+$ by using a formula $$H_m^+ = (H_{m-1} + \beta_{n_{m-1}}{}^* \beta_{n_{m-1}}{}^H)^{-1} = H_{m-1}^+ - \frac{H_{m-1}^+ \beta_{n_{m-1}}{}^* \beta_{n_{m-1}}{}^H H_{m-1}^+}{1 + \beta_{n_{m-1}}{}^H H_{m-1}^+ \beta_{n_{m1}}},$$

where $H_{m\text{-}1}^+$ represents a generalized inverse matrix of a channel value matrix $H_{m\text{-}1}$ of the K users in the $(m-1)^{th}$ iteration, and $\beta_{n_{m\text{-}}1}$ represents a column that is in $H_{m\text{-}1}$ and that corresponds to an antenna index $n_{m\text{-}1}$ selected in the $(m-1)^{th}$ iteration.

In an embodiment, complexity of a plurality of large matrix inversions can be reduced.

In an embodiment, the determining $H_m^+$ of a channel value matrix $H_m$ includes: setting, to zero, a column that is in an initial channel value matrix H of the K users and that corresponds to an antenna index n selected until the $(m-1)^{th}$ iteration ends, to obtain $H_m$; and calculating $H_m^+$ based on $H_m$.

In an embodiment, the selecting, from a set $S1_{m\text{-}1}$ based on $H_m$, $n_m$ and an update coefficient $\alpha_m$ corresponding to $n_m$ includes: substituting M−m+1 n in $S1_{m\text{-}1}$ into a formula one by one:

$$\alpha = \frac{-\text{real}(r(H_m^+, n)^* r(W_{m-1}, n)^H) + \sqrt{\text{real}(r(H_m^+, n)^* r(W_{m-1}, n)^H)^2 - \|r(H_m^+, n)\|^2 (\|r(W_{m-1}, n)\|^2 - P)}}{\|r(H_m^+, n)\|^2}$$

and/or $$\alpha = \frac{-\text{real}(r(H_m^+, n)^* r(W_{m-1}, n)^H) - \sqrt{\text{real}(r(H_m^+, n) * r(W_{m-1}, n)^H)^2 - \|r(H_m^+, n)\|^2 (\|r(W_{m-1}, n)\|^2 - P)}}{\|r(H_m^+, n)\|^2};$$

and determining n making a smallest $|\alpha|$ as an antenna index $n_m$ selected in the $m^{th}$ iteration process, and determining the smallest $|\alpha|$ as $\alpha_m$.

In an embodiment, when m=J, the assigning a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S1_{M-J+1})$.

In an embodiment, after the row that is in $W_m$ and that corresponds to $n_m$ is assigned to the $(n_m)^{th}$ row in the final weight matrix $W_{opt}$, the method further includes: deleting rows that are in $W_m$ and $H_m^+$ and that correspond to $n_m$; and deleting a column that is in $H_m$ and that corresponds to $n_m$.

In an embodiment, a set $S2_{m\text{-}1}$ is set, M−m+1 numbers a in $S2_{m\text{-}1}$ are in a one-to-one correspondence with M−m+1 n in $S1_{m\text{-}1}$, and the selecting, from a set $S1_{m\text{-}1}$ based on $H_m$, $n_m$ and an update coefficient $\alpha_m$ corresponding to $n_m$ includes: substituting the M−m+1 numbers a in the set $S2_{m\text{-}1}$ into a formula one by one:

$$\alpha = \frac{-\text{real}(r(H_m^+, a)^* r(W_{m-1}, a)^H) + \sqrt{\text{real}(r(H_m^+, a)^* r(W_{m-1}, a)^H)^2 - \|r(H_m^+, a)\|^2 (\|r(W_{m-1}, a)\|^2 - P)}}{\|r(H_m^+, a)\|^2}$$

and/or

-continued $$\alpha = \frac{-\text{real}(r(H_m^+, a)^* r(W_{m-1}, a)^H) - \sqrt{\text{real}(r(H_m^+, a)^* r(W_{m-1}, a)^H)^2 - \|r(H_m^+, a)\|^2 (\|r(W_{m-1}, a)\|^2 - P)}}{\|r(H_m^+, a)\|^2};$$

and determining n that is in $S1_{m-1}$ and that corresponding to a making a smallest $|\alpha|$ as an antenna index $n_m$ selected in the $m^{th}$ iteration process, and determining the smallest $|\alpha|$ as $\alpha_m$.

In an embodiment, when m=J, the assigning a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S2_{M-J+1})$.

In an embodiment, before the J iteration operations are performed, the method further includes: performing normalization processing on transmit powers of the M antennas to obtain an original precoding weight matrix; calculating a power utilization of the transmit powers of the M antennas based on the original precoding weight matrix; and when the power utilization is less than a preset threshold, performing the J iteration operations.

According to a second aspect, this application provides an apparatus. The apparatus may be a network device, or may be a chip in the network device. The apparatus has a function of implementing the method according to the first aspect. The function may be implemented by hardware, or may be implemented by hardware by executing corresponding software. The hardware or the software includes one or more modules corresponding to the function. The apparatus may include a first weight calculation module, a data weighting module, a power decision module, a second weight calculation module, and the like.

In an embodiment, when the apparatus is a network device, the first weight calculation module, the data weighting module, the power decision module, and the second weight calculation module may be integrated into a processor of the network device. In an embodiment, the network device further includes a memory. When the network device includes a memory, the memory is configured to store computer execution instructions, the processor is connected to the memory, and the processor executes the computer execution instructions stored in the memory, to enable the network device to perform the method in the first aspect.

In an embodiment, when the apparatus is a chip in the network device, the first weight calculation module, the data weighting module, the power decision module, and the second weight calculation module may be integrated into a processor of the chip. In an embodiment, the chip further includes a memory. When the chip includes a memory, the memory is configured to store computer execution instructions, the processor is connected to the memory, and the processor executes the computer execution instructions stored in the memory, to enable the chip in the network device to perform the method in the first aspect. In an embodiment, the memory is a memory inside the chip, for example, a register or a buffer, or the memory may be a memory located inside the terminal but outside the chip, for example, a read-only memory (ROM) or another type of static storage device that can store static information and instructions, or a random access memory (RAM).

Specifically, the first weight calculation module is configured to determine a generalized inverse matrix $H_m^+$ of a channel value matrix $H_m$ of K users in an $m^{th}$ iteration in J iteration operations, where m=1, 2, ..., and J, $1 \leq J \leq M-K+1$, J is an integer, and M is a quantity of antennas; select, from a set $S1_{m-1}$ based on $H_m^+$, an antenna index $n_m$ and an update coefficient $\alpha_m$ corresponding to $n_m$, where $S1_{m-1}$ is a set of n unselected in antenna indexes n of the M antennas until an $(m-1)^{th}$ iteration ends; determine a weight matrix $W_m$ based on $H_m^+$ and $\alpha_m$; and assign a row that is in $W_m$ and that corresponds to $n_m$ to a row that is in a final weight matrix $W_{opt}$ and that corresponds to $n_m$, where $W_{opt}$ is used by the data weighting module to adjust transmit powers of at least J of the M antennas to a preset maximum transmit power P after the first weight calculation module completes the J iteration operations.

In an embodiment, a product of $H_m$ and $W_m$ is a diagonal matrix or approximates to a diagonal matrix.

In an embodiment, that the first weight calculation module determines a weight matrix $W_m$ based on H and $\alpha_m$ includes: calculating $W_m$ by using a formula $W_m = W_{m-1} + \alpha_m H_m^+$, where $W_{m-1}$ is a weight matrix used in the $(m-1)^{th}$ iteration.

In an embodiment, when m is greater than 2, that the first weight calculation module determines $H_m^+$ of $H_m$ of K users includes: calculating $H_m^+$ by using a formula $$H_m^+ = (H_{m-1} + \beta_{n_{m-1}} {}^* \beta_{n_{m-1}}{}^H)^{-1} = H_{m-1}^+ - \frac{H_{m-1}^+ \beta_{n_{m-1}} {}^* \beta_{n_{m-1}}{}^H H_{m-1}^+}{1 + \beta_{n_{m-1}}{}^H H_{m-1}^+ \beta_{n_{m-1}}},$$

where $H_{m-1}^+$ represents generalized inverse matrix of a channel value matrix $H_{m-1}$ of the K users in the $(m-1)^{th}$ iteration, and $\beta_{n_{m-1}}$ represents a column that is in $H_{m-1}$ and that corresponds to an antenna index $n_{m-1}$ selected in the $(m-1)^{th}$ iteration.

In an embodiment, that the first weight calculation module determines $H_m^+$ of a channel value matrix $H_m$ includes: setting, to zero, a column that is in an initial channel value matrix H of the K users and that corresponds to an antenna index n selected until the $(m-1)^{th}$ iteration ends, to obtain $H_m$; and calculating $H_m^+$ based on $H_m$.

In an embodiment, that the first weight calculation module selects, from a set $S1_{m-1}$ based on $H_m^+$, $n_m$ and an update coefficient $\alpha_m$ corresponding to $n_m$ includes: substituting M−m+1 n in $S1_{m-1}$ into a formula one by one:

$$\alpha = \frac{-\text{real}(r(H_m^+, n)^* r(W_{m-1}, n)^H) + \sqrt{\text{real}(r(H_m^+, n)^* r(W_{m-1}, n)^H)^2 - \|r(H_m^+, n)\|^2 (\|r(W_{m-1}, n)\|^2 - P)}}{\|r(H_m^+, n)\|^2}$$

and/or $$\alpha = \frac{-\text{real}(r(H_m^+, n)^* r(W_{m-1}, n)^H) - \sqrt{\text{real}(r(H_m^+, n)^* r(W_{m-1}, n)^H)^2 - \|r(H_m^+, n)\|^2 (\|r(W_{m-1}, n)\|^2 - P)}}{\|r(H_m^+, n)\|^2};$$

and determining n making a smallest $|\alpha|$ as an antenna index $n_m$ selected in the $m^{th}$ iteration process, and determining the smallest $|\alpha|$ as $\alpha_m$.

In an embodiment, when m=J, that the first weight calculation module assigns a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S1_{M-J+1})$.

In an embodiment, the first weight calculation module is further configured to: after the row that is in $W_m$ and that corresponds to $n_m$ is assigned to the $(n_m)^{th}$ row in the final weight matrix $W_{opt}$, delete rows that are in $W_m$ and $H_m^+$ and that correspond to $n_m$; and delete a column that is in $H_m$ and that corresponds to $n_m$.

In an embodiment, a set $S2_{m-}1$ is set, M−m+1 numbers a in $S2_{m-}1$ are in a one-to-one correspondence with M−m+1 n in $S1_{m-}1$, and that the first weight calculation module selects, from a set $S1_{m-}1$ based on $H_m$, $n_m$ and an update coefficient $\alpha_m$ corresponding to $n_m$ includes: substituting the M−m+1 numbers a in the set $S2_{m-}1$ into a formula one by one:

$$\alpha = \frac{-\text{real}(r(H_m^+, a)^* r(W_{m-1}, a)^H) + \sqrt{\text{real}(r(H_m^+, a)^* r(W_{m-1}, a)^H)^2 - \|r(H_m^+, a)\|^2(\|r(W_{m-1}, a)\|^2 - P)}}{\|r(H_m^+, a)\|^2}$$

and/or $$\alpha = \frac{-\text{real}(r(H_m^+, a)^* r(W_{m-1}, a)^H) - \sqrt{\text{real}(r(H_m^+, a)^* r(W_{m-1}, a)^H)^2 - \|r(H_m^+, a)\|^2(\|r(W_{m-1}, a)\|^2 - P)}}{\|r(H_m^+, a)\|^2};$$

and determining n that is in $S1_{m-}1$ and that corresponding to a making a smallest $|\alpha|$ as an antenna index $n_m$ selected in the $m^{th}$ iteration process, and determining the smallest $|\alpha|$ as $\alpha_m$.

In an embodiment, when m=J, that the first weight calculation module assigns a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S2_{M-J+1})$.

In an embodiment, the apparatus further includes the second weight calculation module and the power decision module. The second weight calculation module is configured to: before the first weight calculation module performs the J iteration operations, perform normalization processing on transmit powers of the M antennas to obtain an original precoding weight matrix. The power decision module is configured to calculate a power utilization of the transmit powers of the M antennas based on the original precoding weight matrix calculated by the second weight calculation module. The first weight calculation module is configured to: when the power utilization calculated by the power decision module is less than a preset threshold, perform the J iteration operations.

For technical effects of the apparatus provided in this application, refer to technical effects of the first aspect or the implementations of the first aspect. Details are not described herein again.

The processor mentioned anywhere above may be a general-purpose central processing unit (CPU), a microprocessor, an application-specific integrated circuit (ASIC), or one or more integrated circuits configured to control program execution of the method in the second aspect.

According to a third aspect, an embodiment of this application provides a computer storage medium. The computer storage medium stores a program used to implement the method in the first aspect. When the program runs in a network device, the network device is enabled to perform the method in the first aspect.

According to a fourth aspect, an embodiment of this application provides a computer program product. The program product includes a program, and when the program is run, the method in the first aspect is performed.

DESCRIPTION OF EMBODIMENTS

First, words such as "example" or "for example" below are used to represent an example, an illustration, or a description. Any embodiment or design solution described as "example" or "for example" in embodiments of this application should not be interpreted as being more preferable or more advantageous than another implementation or design solution. Exactly, use of the terms such as "example" or "for example" is intended to present a related concept in a specific manner.

Unless otherwise stated, in this specification, "/" usually represents that associated objects before and after "/" are in an "or" relationship. For example, A/B may represent A or B. The term "and/or" describes only an association relationship for describing associated objects and represents that three relationships may exist. For example, A and/or B may represent the following three cases: Only A exists, both A and B exist, and only B exists. In addition, in descriptions of this application, "a plurality of" refers to two or more.

The precoding method provided in this application is applied to a network device having a multi-antenna transmission module. The network device can support a fourth generation (4G) access technology, such as a long term evolution (LTE) access technology, or support a fifth generation (5G) access technology, such as a new radio (NR) access technology, or support a plurality of wireless technologies, such as an LTE technology and an NR technology. In addition, the network device may also be applied to a future-oriented communication technology.

The network device may be a base station, for example, an evolved nodeB (eNB) in a communication system based on the 4G access technology, a next generation nodeB (gNB) in a communication system based on the 5G access technology, a transmission reception point (TRP), a relay node or an access point (AP).

Figure 1:
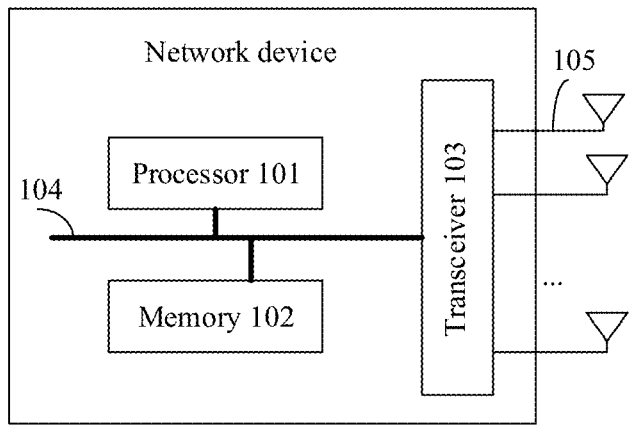
FIG. 1 is a schematic diagram of a structure of a network device according to this application.

FIG. 1 is a schematic diagram of a structure of a network device according to this application. The network device includes a processor 101, a memory 102, a transceiver 103, and a communication bus 104. The processor 101, the memory 102, and the transceiver 103 are connected via a communication bus 104.

The processor 101 in this embodiment of this application may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logic operation. For example, the processor 101 may be a single-core (single-CPU) processor or a multi-core (multi-CPU) processor. The at least one processor 101 may be integrated into one chip or located on a plurality of different chips.

The memory 102 in this embodiment of this application may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 102 may exist independently, and is connected to the processor 101. In an embodiment, the memory 102 and the processor 101 may be integrated, for example, integrated into one chip. The memory 102 can store program code for executing the technical solutions in the embodiments of this application, and the processor 101 controls execution of the program code. Various types of computer program code to be executed may also be considered as drivers of the processor 101. For example, the processor 101 is configured to execute the computer program code stored in the memory 102, to implement the technical solutions in the embodiments of this application.

The transceiver 103 may be configured to support receiving or sending of an air interface signal between network devices, and the transceiver 103 may be connected to a plurality of antennas 105. The transceiver 103 includes a transmitter Tx and a receiver Rx. Specifically, one or more antennas 105 may receive a radio frequency signal. The receiver Rx of the transceiver 103 is configured to: receive the air interface signal from the antenna, convert the air interface signal into a digital baseband signal or a digital intermediate frequency signal, and provide the digital baseband signal or the digital intermediate frequency signal to the processor 101, so that the processor 101 further processes the digital baseband signal or the digital intermediate frequency signal, for example, performs demodulating processing and decoding processing. In addition, the transmitter Tx in the transceiver 103 is further configured to: receive a modulated digital baseband signal or digital intermediate frequency signal from the processor 101, convert the modulated digital baseband signal or digital intermediate frequency signal into an air interface signal, and send the air interface signal through the one or more antennas 105.

In the precoding method provided in this application, for M (M≥1) antennas of a network device, transmit powers of J selected antennas can be adjusted to a maximum transmit power through J (1≤J≤M−K+1, where J is an integer) iteration operations, and it can be ensured that transmit powers of M-J unselected antennas do not exceed the maximum transmit power. In other words, according to the precoding method provided in this application, powers of at least J of the M antennas can reach a full power, thereby improving a power utilization.

The precoding method and the apparatus provided in this application are illustrated below with reference to specific embodiments.

It is assumed that a network device has M (M≥1, where M is an integer) antennas, and antenna indexes n are respectively configured for the M antennas. For example, the antenna indexes of the M antennas are respectively 0 to M−1 (n=0, 1, ..., and M−1), 1 to M (n=1, 2, ..., and M), or other continuous/discontinuous values. When a quantity of users for whom the M antennas are spatially multiplexed is K (K≥1, where K is an integer), a maximum of M−K+1 iteration operations may be performed based on the precoding method provided in this application.

Figure 2:
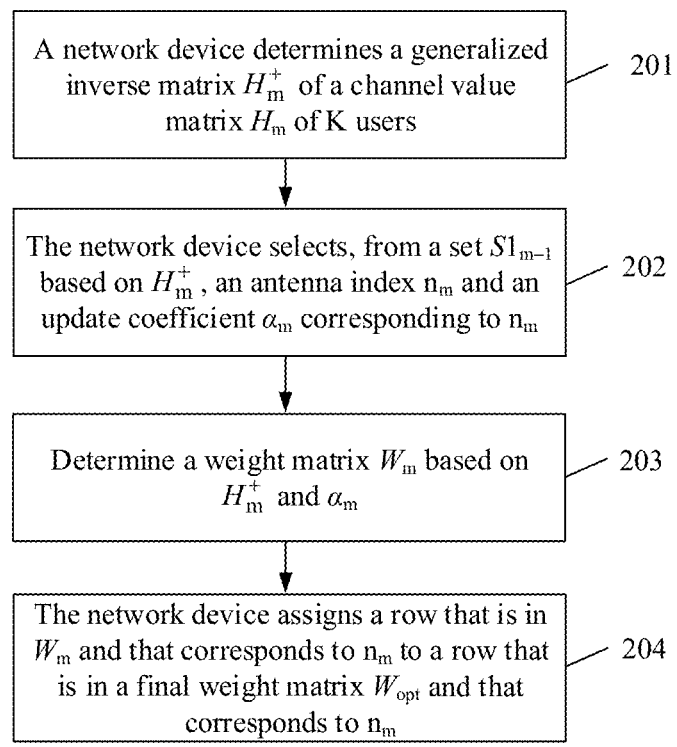
FIG. 2 is a flowchart 1 of an embodiment of a precoding method according to this application.

FIG. 2 is a flowchart of an embodiment of a precoding method according to this application, and mainly describes an $m^{th}$ (m=1, 2, ..., and J) iteration process in J iteration processes. The method includes the following operations.

Step 201: The network device determines a generalized inverse matrix $H_m^+$ of a channel value matrix $H_m$ of the K users.

In this application, the channel value matrix $H_m$ required in the $m^{th}$ iteration process may be first calculated, and then $H_m^+$ is calculated based on $H_m$.

In an embodiment, a column that is in an initial channel value matrix H of the K users and that corresponds to an antenna index n selected until an $(m-1)^{th}$ iteration ends is set to zero, to obtain $H_m$, and then $H_m$ is inverted to calculate $H_m^+$.

In this application, for each iteration operation, the network device selects an antenna, and calculates a corresponding weight, to adjust a transmit power of the antenna to a maximum transmit power. Therefore, to avoid impact of a weight calculated in a current iteration process on a transmit power of an antenna that has been selected, a channel value corresponding to the antenna that has been selected may be set to zero.

For example, assuming that the antenna indexes n of the M antennas are respectively 1 to M, a set S1 may be set to represent a set of unselected n. Before the J iteration operations are performed, S1={1, 2, ..., M}. Each time an iteration is performed, a selected n is deleted from S1. Then, S1 until the $(m-1)^{th}$ iteration ends may be represented by $S1_{m-1}$, to record n unselected in the antenna indexes n of the M antennas until the $(m-1)^{th}$ iteration ends.

Then, $H_m$ may be calculated by using the following formula (1):

$$H_m = H \operatorname{diag}\{x_1, x_2, \ldots, x_M\} \qquad (1)$$

where $x_n$ represents a coefficient corresponding to an antenna index n. In the $m^{th}$ iteration process, when $n \notin S1_{m-1}$, $x_n=0$; when $n \in S1_{m-1}$, $x_n=1$. The formula (1) indicates that columns corresponding to m−1 antennas selected until the $(m-1)^{th}$ iteration ends are set to zero.

After $H_m$ is calculated by using the formula (1) $H_m^+$ may be calculated based on $H_m$.

In an embodiment, the network device may perform a column deletion operation when each iteration ends. For example, after the $(m-1)^{th}$ iteration operation ends, a column that is in $H_m-1$ and that corresponds to an antenna index $n_{m-1}$ selected in the $(m-1)^{th}$ iteration is deleted to obtain $H_m$. Then, $H_m^+$ is calculated based on $H_m$.

In an embodiment, the network device may alternatively use a matrix inversion lemma, and obtain $H_m$ based on a generalized inverse matrix $H_{m-1}^+$ of a channel value matrix of the K users that is obtained in the $(m-1)^{th}$ iteration. In this way, complexity of a plurality of large matrix inversions is reduced.

For example, based on a matrix inversion lemma shown in the following formula (2):

$$(A+ab^H)^{-1} = A^{-1} - \frac{A^{-1}ab^H A^{-1}}{1+b^H A^{-1}a} \quad (2)$$

the following formula (3) may be obtained:

$$H_m^+ = (H_{m-1} + \beta_{n_{m-1}}{}^* \beta_{n_{m-1}}{}^H)^{-1} = \quad (3)$$
$$H_{m-1}^+ - \frac{H_{m-1}^+ \beta_{n_{m-1}}{}^* \beta_{n_{m-1}}{}^H H_{m-1}^+}{1+\beta_{n_{m-1}}{}^H H_{m-1}^+ \beta_{n_{m-1}}}$$

where $H_{m-1}^+$ represents the generalized inverse matrix of the channel value matrix $H_{m-1}$ of the K users in the $(m-1)^{th}$ iteration, and $\beta_{n_{m-1}}$ represents the column that is in $H_{m-1}$ and that corresponds to the antenna index $n_{m-1}$ selected in the $(m-1)^{th}$ iteration.

In the first iteration process, that is, when m=1, the network device may directly obtain a corresponding generalized inverse matrix by using the initial channel value matrix H. When m is greater than 2, the network device may directly substitute $H_{m-1}^+$ and $\beta_{n_{m-1}}$ into the formula (3) to obtain $H_m^+$.

Step 202: The network device selects, from a set $S1_{m-1}$ based on $H_m^+$, $n_m$ and an update coefficient $\alpha_m$ corresponding to $n_m$.

For example, when $H_m^+$ is calculated in a zero setting manner, the network device may substitute M−m+1 n in $S_{m-1}$ into the following formula (4) and/or formula (5) one by one:

$$\alpha = \quad (4)$$
$$\frac{-\text{real}(r(H_m^+, n)^* r(W_{m-1}, n)^H) + \sqrt{\text{real}(r(H_m^+, n)^* r(W_{m-1}, n)^H)^2 - \|r(H_m^+, n)\|^2(\|r(W_{m-1}, n)\|^2 - P)}}{\|r(H_m^+, n)\|^2}$$

and $$\alpha = \quad (5)$$
$$\frac{-\text{real}(r(H_m^+, n)^* r(W_{m-1}, n)^H) - \sqrt{\text{real}(r(H_m^+, n)^* r(W_{m-1}, n)^H)^2 - \|r(H_m^+, n)\|^2(\|r(W_{m-1}, n)\|^2 - P)}}{\|r(H_m^+, n)\|^2};$$

and determine n making a smallest $|\alpha|$ as an antenna index $n_m$ selected in the $m^{th}$ iteration process, and determine the smallest $|\alpha|$ as $\alpha_m$, where $W_{m-1}$ is a weight matrix used in the $(m-1)^{th}$ iteration.

In this application, the selected antenna index indicates that an antenna indicated by the antenna index is selected.

Alternatively, when $H_m^+$ is calculated in a row deletion manner, a set $S2_{m-1}$ may be set, and M−m+1 numbers a in $S2_{m-1}$ are in a one-to-one correspondence with M−m+1 n in $S1_{m-1}$. The network device may substitute the M−m+1 numbers a in the set $S2_{m-1}$ into the following formula (6) and/or formula (7) one by one:

$$\alpha = \frac{-\text{real}(r(H_m^+, a)^* r(W_{m-1}, a)^H) + \sqrt{\text{real}(r(H_m^+, a)^* r(W_{m-1}, a)^H)^2 - \|r(H_m^+, a)\|^2(\|r(W_{m-1}, a)\|^2 - P)}}{\|r(H_m^+, a)\|^2} \quad (6)$$

$$\alpha = \quad (7)$$
$$\frac{-\text{real}(r(H_m^+, a)^* r(W_{m-1}, a)^H) - \sqrt{\text{real}(r(H_m^+, a)^* r(W_{m-1}, a)^H)^2 - \|r(H_m^+, a)\|^2(\|r(W_{m-1}, a)\|^2 - P)}}{\|r(H_m^+, a)\|^2};$$

and and determine n that is in $S1_{m-1}$ and that corresponds to a making a smallest $|\alpha|$ as an antenna index $n_m$ selected in the $m^{th}$ iteration process, and determine the smallest $|\alpha|$ as $\alpha_m$.

Step 203: Determine a weight matrix $W_m$ based on $H_m^+$ and $\alpha_m$.

For example, the weight matrix used in the $m^{th}$ iteration may be calculated by using the weight matrix $W_{m-1}$ used in the $(m-1)^{th}$ iteration and $H_m^+$. For example, $W_m$ may be calculated by using the following formula (8):

$$W_m = W_{m-1} + \alpha_m H_m^+ \quad (8)$$

In this application, on one hand, $W_m$ needs to ensure orthogonality between the plurality of users.

Assuming that an initial weight matrix $W_0$ is a zero matrix, in the first iteration, $W_1 = W_0 + \alpha_1 H_1^+ = \alpha_1 H_1^+$, in the second iteration, $W_2 = W_1 + \alpha_2 H_2^+$, and so on. It can be learned that the weight matrix is related to the generalized inverse matrix of the channel value matrix, and is a row-full rank matrix.

Such a theorem exists: If there is a matrix A and A is a row-full rank L×Q(L≤Q), there is a matrix B that is a row-full rank L×Q (where L-Q columns are zero vectors), a non-zero column vector of the matrix B is a submatrix of A. In other words, a non-zero column vector of B is a subset of columns of A. Then, $AB^+ = I_L$.

The following proof (9) may be obtained based on the theorem:

$$AB^+ = [A]_{c,d}[B^+]_{d,e} = [B]_{c,f}[B^+]_{f,e} = BB^+ = I_L \quad (9)$$

$W_{m-1}$ and $H_m^+$ meet the condition of the foregoing theorem, and therefore, based on the theorem and the proof (9), it can be learned that:

$$\begin{cases} H_m r(W_{m-1}, n) = 0 \\ H_m r(H_m^+, n) = 0 \end{cases} \quad (10A)$$

where $r(H_m^+, n)$ represents an $n^{th}$ row of $H_m^+$, and $r(W_{m-1}, n)$ represents an $n^{th}$ row of $W_{m-1}$.

Then, based on the formula (10A) and the formula (8), it can be learned that a product of $H_m$ and $W_m$ is a diagonal matrix or approximates to a diagonal matrix. That is, when i=j, $[H_m W_m]_{i,j} \neq 0$; when i≠j, $[H_m W_m]_{i,j}$ is equal to 0 or approximates to 0. Therefore, the weight matrix $W_m$ calculated in the $m^{th}$ iteration process can ensure the orthogonality between the plurality of users.

On the other hand, $W_m$ needs to ensure that a transmit power of an antenna indicated by $n_m$ selected in the $m^{th}$ iteration process can be adjusted to a maximum transmit power P, and transmit powers of antennas indicated by remaining antenna indexes in $S1_{m-1}$ other than $n_m$ are less than or equal to P.

That is, $n_m$ in $S1_{m-1}$ makes $\|r(W_{m-1}, n_m)\|^2 = P$, and a remaining n in $S1_{m-1}$ other than $n_m$ makes $\|r(W_{m-1}, n)\|^2 \leq P$.

Then, an equation (10B) may be obtained:

$$f_{m,n}(\alpha) = \|r(W_{m-1}, n) + \alpha r(H_m^+, n) + \alpha\|^2 - P \quad (10B)$$

For the equation (10B), $n_m$ making $f_{m,n}(\alpha) = 0$ may be found, and a remaining n in $S1_{m-1}$ other than $n_m$ makes $f_{m,n}(\alpha) \leq 0$.

Based on the following solving process:

$$\|r(W_{m-1}, n) + \alpha r(H_m^+, n) + \alpha\|^2 - P$$
$$= (r(W_{m-1}, n) + \alpha r(H_m^+, n))^H (r(W_{m-1}, n) + \alpha r(H_m^+, n)) - P$$
$$= r(W_{m-1}, n)^H r(W_{m-1}, n_-) + \alpha r(W_{m-1}, n)^H r(H_m^+, n) +$$
$$\alpha r(H_m^+, n)^H r(W_{m-1}, n) + \alpha^2 r(H_m^+, n)^H r(H_m^+, n) - P$$
$$= \|r(W_{m-1}, n)\|^2 = P + 2\alpha \operatorname{real}(r(W_{m-1}, n)^H r(H_m^+, n)) + \alpha^2 \|r(H_m^+, n)\|^2$$
$$= 0$$

it can be learned that the equation (10B) is a convex function and has one or two solutions. Then, the equation 8 is converted into a binomial solution formula, to obtain a formula (11) (that is, the foregoing formula (4) and formula (5)):

$$\alpha = \frac{-\operatorname{real}(r(H_m^+, n)^* r(W_{m-1}, n)^H) \pm \sqrt{\operatorname{real}(r(H_m^+, n)^* r(W_{m-1}, n)^H)^2 - \|r(H_m^+, n)\|^2 (\|r(W_{m-1}, n)\|^2 - P)}}{(\|r(H_m^+, n)\|^2)} \quad (11)$$

In the formula (11), an absolute value of the second term of the numerator is always greater than the first term, and therefore, $\alpha$ has a positive solution and a negative solution.

Each n in $S1_{m-1}$ is substituted into the formula (4), the formula (5), or the formula (4) and the formula (5) one by one, to obtain corresponding $\alpha$. After each n and the corresponding $\alpha$ are substituted into the equation (10B), a function curve of an antenna corresponding to each n in $S1_{m-1}$ may be obtained. For example, it is assumed that $S1_{m-1}$ includes four n: n1, n2, n3, and n4. After corresponding $\alpha$ is obtained based on the formula (4) and/or the formula (5), n1, n2, n3, n4, and corresponding $\alpha$ are substituted into the equation (10B). Functions of antennas indicated by n1, n2, n3, and n4 are shown in FIG. 3.

Figure 3:
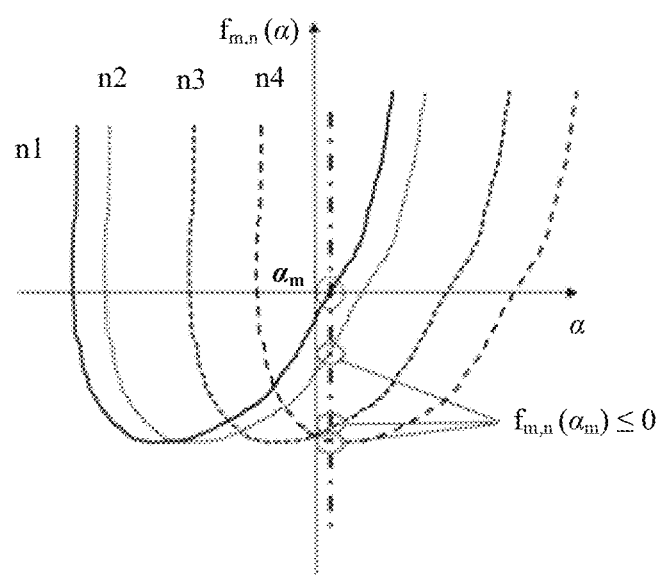
FIG. 3 is a schematic diagram of functions of antennas according to this application.

Based on FIG. 3, it can be learned that a smallest $|\alpha|$ ($\alpha_m$) obtained based on n1 can make $f_{m,n1}(\alpha_m) = 0$, and $f_{m,n}(\alpha_m) \leq 0$, where n=n2, n3, n4.

Therefore, based on the formula (8) and the methods for calculating $\alpha_m$ and determining $n_m$ that are provided in this application, the calculated $W_m$ can ensure that the transmit power of the antenna indicated by $n_m$ can be adjusted to the maximum power P, and the transmit powers of the antennas indicated by the remaining antenna indexes in $S1_{m-1}$ other than $n_m$ are less than or equal to P.

Step 204: The network device assigns a row that is in $W_m$ and that corresponds to $n_m$ to a row that is in a final weight matrix $W_{opt}$ and that corresponds to $n_m$.

$W_{opt}$ is used to adjust the transmit powers of the M antennas after the J iteration operations end. In this application, the row that is in $W_m$ and that corresponds to $n_m$ can adjust the transmit power of the antenna corresponding to $n_m$ to P. Therefore, the row that is in $W_m$ and that corresponds to $n_m$ may be assigned to the row that is in $W_{opt}$ and that corresponds to $n_m$, to ensure that $W_{opt}$ can adjust the transmit power of the antenna corresponding to $n_m$ to P.

Then, when the J iterations end, after the transmit powers of the M antennas are adjusted by using $W_{opt}$, transmit powers of antennas selected in the J iteration processes can be adjusted to P.

It may be understood that if $H_m$ is calculated based on the formula (1), each time an iteration is performed, a column corresponding to a selected antenna in a channel value matrix is set to zero. Therefore, a corresponding row in a weight matrix calculated in a subsequent iteration process is also set to zero. Therefore, the weight matrix calculated in the subsequent iteration process does not affect a transmit power of the antenna that has been selected. In other words, the antenna selected in the $(m-1)^{th}$ iteration process before the $m^{th}$ iteration is still maintained at P.

In an embodiment, after each iteration ends, the network device may alternatively delete rows corresponding to a selected antenna in a weight matrix obtained in the current iterative calculation and a generalized inverse matrix of a channel value matrix, and delete a column corresponding to the selected antenna in the channel value matrix.

For example, after the $m^{th}$ iteration ends, a column that is in $H_m$ and that corresponds to $n_m$ is deleted, and rows that are in $W_m$ and $H_m^+$ and that corresponds to $n_m$ are deleted, to avoid impact of a subsequent iteration process on the transmit power of the antenna indicated by $n_m$. In addition, calculation complexity of the subsequent iteration process can be reduced.

$W_J$ in a $J^{th}$ iterative calculation can ensure that a transmit power of a selected antenna is adjusted to P, and transmit powers of unselected antennas are less than or equal to P. Therefore, the network device may directly assign a row that is in $W_J$ and that corresponds to $n_J$ selected in the $J^{th}$ iterative calculation and rows corresponding to M-J n unselected until the J iterations to rows in $W_{opt}$ one by one. In this way, after the transmit powers of the M antennas are adjusted by using $W_{opt}$, the transmit powers of the antennas selected in the J iteration processes can be adjusted to P, and transmit powers of M-J remaining unselected antennas are less than or equal to P.

Iteration operations of the precoding method provided in this application are illustrated below respectively with reference to the zero setting and row deletion manners by using J=3 as an example.

When the zero setting manner is used, three iterations are as follows:

S301. Initialize parameters:

$$S1_0 = [1, \ldots, M], W_0 = [0,0, \ldots, 0,0] \in C^{M \times K}, \text{ and}$$
$$H = [h_1^H; h_2^H; \ldots; h_K^H]$$

where $h_1$ represents a channel or a channel feature vector of a first user, $h_2$ represents a channel or a channel feature vector of a second user, . . . , and $h_K$ represents a channel or a channel feature vector of a $K^{th}$ user. The antenna indexes n of the M antennas are respectively 1, 2, . . . , and M, respectively corresponding to a first row, a second row, . . . , and an $M^{th}$ row of the initial weight matrix $W_0$.

S302. Start the first iteration, and calculate $H_1^+$ of $H_1$:

In the first iteration process, the initial channel value matrix H may be used as the channel value matrix $H_1$ used in the first iteration, and then $H_1^+$ is directly calculated based on $H_1$. For example, an inverse matrix $U_1=\text{inv}(H_1*H_1^H)$ of $H_1$ is calculated, and then $H_1^+$ is calculated by using $H_1^+=H_1^{H}*U_1$.

S303. Search for $n_1$ that is in $S1_0$ and that makes a smallest $|\alpha|$, and $\alpha_1$:

A for loop may be used to substitute the M antenna indexes n in $S1_0$ into a formula $$|\alpha| = \frac{\sqrt{P}}{\|r(H^+, n)\|}$$

one by one, to obtain $[\alpha_1, n_1]=\text{argmin}(|\alpha|_{min})$.

S304. Update a weight matrix.

A weight matrix $W_1=W_0+\alpha_1 H_1^+=\alpha_1 H_1^+$ in the first iteration is calculated, where $W_1 \in C^{M \times K}$.

A row that is in $W_1$ and that corresponds to $n_1$ (that is, an $(n_1)^{th}$ row in $W_1$) is assigned to a row that is in $W_{opt}$ ($W_{opt} \in C^{M \times K}$) and that corresponds to $n_1$ (that is, an $(n_1)^{th}$ row in $W_{opt}$). That is, $r(W_{opt}, n_1)=r(W_1, n_1)$.

S305. Delete $n_1$ from $S1_0$ to obtain $S1_1$, that is, $S1_1$ includes M−1 remaining antenna indexes other than $n_1$.

S306. Start the second iteration, and calculate $H_2^+$ of $H_2$:

$H_2$ is calculated based on the formula (1). Because $n_1 \notin S1_1$ and $x_{n_1}=0$, an $(n_1)$th column in H is set to zero, to obtain $H_2$.

Then, $H_2^+$ is calculated based on $H_2$. For example, an inverse matrix $U_2=\text{inv}(H_2*H_2^H)$ of $H_2$ is calculated, and then $H_2^+$ is calculated by using $H_2^+=H_2^{H}*U_2$.

S307. Search for $n_2$ that is in $S1_1$ and that makes a smallest $|\alpha|$, and $\alpha_2$:

The for loop may be used to substitute the M−1 n in $S1_1$ into the formula (4) and/or the formula (5) one by one, to obtain $[\alpha_2, n_2]=\text{argmin}(|\alpha|_{min})$.

S308. Update the weight matrix.

A weight matrix $W_2=W_1+\alpha_2 H_2^+$ in the second iteration is calculated, where $W_2 \in C^{M \times K}$.

A row that is in $W_2$ and that corresponds to $n_2$ (that is, an $(n_2)^{th}$ row in $W_2$) is assigned to a row that is in $W_{opt}$ and that corresponds to $n_2$ (that is, an $(n_2)^{th}$ row in $W_{opt}$). That is, $r(W_{opt}, n_2)=r(W_2, n_2)$.

S309. Delete $n_2$ from $S1_1$ to obtain $S1_2$, that is, $S1_2$ includes M−2 remaining antenna indexes other than $n_1$ and $n_2$.

S310. Start the third iteration, and calculate $H_3^+$ of $H_3$:

$H_3$ is calculated based on the formula (1). Because $n_1 \notin S1_1$, $x_{n_1}=0$, $n_2 \notin S1_2$, and $x_{n_2}=0$, $(n_1)$th and $(n_2)$th columns in H are set to zero, to obtain $H_3$.

Then, $H_3^+$ is calculated based on $H_3$. For example, an inverse matrix $U_3=\text{inv}(H_3*H_3^H)$ of $H_3$ is calculated, and then $H_3^+$ is calculated by using $H_3^+=H_3^{H}*U_3$.

S311. Search for $n_3$ that is in $S1_2$ and that makes a smallest $|\alpha|$, and $\alpha_3$:

The for loop may be used to substitute the M−2 n in $S1_2$ into the formula (4) and/or the formula (5) one by one, to obtain $[\alpha_3, n_3]=\text{argmin}(|\alpha|_{min})$.

S312. Update the weight matrix.

A weight matrix $W_3=W_2+\alpha_3 H_3^+$ in the first iteration is calculated, where $W_3 \in C^{M \times K}$.

A row that is in $W_3$ and that corresponds to each n in $S1_2$ is assigned to a row that is in $W_{opt}$ and that corresponds to each n in $S1_2$. That is, $r(W_{opt}, S1_2)=r(W_3, S1_2)$.

S313. The iteration ends.

So far, the output $W_{opt}$ can adjust transmit powers of antennas corresponding to the antenna indexes $n_1$, $n_2$, and $n_3$ in the M antennas of the network device to the maximum transmit power, and ensure that transmit powers of the M−3 remaining antennas are less than or equal to the maximum transmit power.

When the row deletion manner is used, three iterations are as follows:

S401. Initialize parameters:
$S1_0=[1, \ldots, M]$,
$S2_0=[1, \ldots, M]$,
$W_0=[0,0, \ldots, 0,0] \in C^{M \times K}$, and
$H=[h_1^H; h_2^H; \ldots; h_K^H]$ where $h_1$ represents a channel or a channel feature vector of a first user, $h_2$ represents a channel or a channel feature vector of a second user, . . . , and $h_K$ represents a channel or a channel feature vector of a $K^{th}$ user. The antenna indexes n of the M antennas are respectively 1, 2, . . . , and M, respectively corresponding to a first row, a second row, . . . , and an $M^{th}$ row of the initial weight matrix $W_0$. The set $S2_0$ of numbers a corresponding to the antenna indexes (or the rows of the weight matrix) is set. Initially, M numbers in $S2_0$ are in a one-to-one correspondence with the M antenna indexes in $S1_0$.

S402. Start the first iteration, and calculate $H_1^+$ of $H_1$:

In the first iteration process, the initial channel value matrix H may be used as the channel value matrix $H_1$ used in the first iteration, and then $H_1^+$ is directly calculated based on $H_1$. For example, an inverse matrix $U_1=\text{inv}(H_1*H_1^H)$ of $H_1$ is calculated, and then $H_1^+$ is calculated by using $H_1^+=H_1^{H}*U_1$.

S403. Determine $n_1$ and $\alpha_1$.

A for loop may be used to substitute the M numbers a in $S2_0$ into a formula $$|\alpha| = \frac{\sqrt{P}}{\|r(H^+, a)\|}$$

one by one, to obtain $[\alpha_1, a_1]=\text{argmin}(|\alpha|_{min})$. $n_1$ that is in $S1_0$ and that corresponds to $a_1$ in $S2_0$ is determined as a selected antenna index. For example, $a_1$ is 3. Then, corresponding $n_1$ is 3.

S404. Update a weight matrix.

A weight matrix $W_1=W_0+\alpha_1 H_1^+=\alpha_1 H_1^+$ in the first iteration is calculated, where $W_1 \in C^{M \times K}$.

An $(a_1)^{th}$ row in $W_1$ is assigned to a row that is in $W_{opt}$ ($W_{opt} \in C^{M \times K}$) and that corresponds to $n_1$ (that is, an $(n_1)^{th}$ row in $W_{opt}$). That is, $r(W_{opt}, n_1)=r(W_1, a_1)$.

S405. Obtain a column that is in $H_1$ and that corresponds to $n_1$ (that is, an $(a_1)^{th}$ column in $H_1$), that is, $g_1=c(H_1,a_1)$; delete a row that is in $W_1$ and that corresponds to $n_1$ (that is, an $(a_1)^{th}$ row in $W_1$), delete a row that is in $H_1^+$ and that corresponds to $n_1$ (that is, an $(a_1)^{th}$ row in $H_1^+$), and delete a column that is in $H_1$ and that corresponds to $n_1$ (that is, an $(a_1)^{th}$ column in $H_1$, to obtain $H_2$; delete $n_1$ from $S1_0$ to obtain $S1_1$, that is, $S1_1$ includes M−1 remaining antenna indexes other than $n_1$; and update $S2_0$ to $S2_1[1, \ldots, M-1]$. 1, 2, . . . , and M−1 in $S2_1$ are in a one-to-one correspondence with the M−1 antenna indexes in $S1_1$.

For example, when M=5, $S1_0=[1,2,3,4,5]$ and $S2_0=[1,2,3,4,5]$. Initially, a number 1 in $S2_0$ corresponds to an antenna index 1 in $S1_0$, a number 2 in $S2_0$ corresponds to an antenna index 2 in $S1_0$, . . . , and a number 5 in $S2_0$ corresponds to an antenna index 5 in $S1_0$.

Assuming that $a_1=3$ is obtained through calculation in S403, it corresponds to the antenna index 3 in $S1_0$. That is, $n_1=3$ is determined. Then, in S404, $r(W_{opt}, 3)=r(W_1, 3)$ is performed. In S405, $g_1=c(H_1, 3)$, a row that is in $W_1$ and that corresponds to the antenna index 3 (that is, a third row in $W_1$) is deleted, a row that is in $H_1^+$ and that corresponds to the antenna index 3 (that is, a third row in $H_1^+$) is deleted, and a column that is in $H_1$ and that corresponds to the antenna index 3 (that is, a third column in $H_1$) is deleted, to obtain $H_2$. 3 is deleted from $S1_0$ to obtain $S1_1$, that is, $S1_1$ includes four remaining antenna indexes other than 3. That is, $S1_1=[1,2,4,5]$. $S2_0$ is updated to $S2_1=[1,2,3,4]$ In this case, the number 1 in $S2_1$ corresponds to the antenna index 1 in $S1_1$, the number 2 in $S2_1$ corresponds to the antenna index 2 in $S1_1$, the number 3 in $S2_1$ corresponds to the antenna index 4 in $S1_2$, and the number 4 in $S2_1$ corresponds to the antenna index 5 in $S1_1$.

It should be noted that, if the generalized inverse matrix of the channel value matrix is calculated by using the formula (3), the column that is in $H_1$ and that corresponds to $n_1$ needs to be obtained for preparation, and the column that is in $H_1$ and that corresponds to $n_1$ is deleted to obtain $H_2$, as described in S405. If the channel value matrix is first calculated and then the generalized inverse matrix of the channel value matrix is calculated, the column that is in $H_1$ and that corresponds to $n_1$ does not need to be obtained, and the column that is in $H_1$ and that corresponds to $n_1$ is directly deleted to obtain $H_2$.

S406. Start the second iteration, and calculate $H_2^+$ of $H_2$:

$H_2^+$ is calculated based on the formula (3) by using $H_1^+$. For example, after $H_1^+$ and $\beta_{n_1}$ (that is, $g_1$) are substituted into the formula (3), a simplified derivation process of the formula (3) is as follows:

$$D1 = g_1^{H*}U_1$$

$$G1 = \frac{D1}{1 - D1^*g_1}$$

$$H_2^+ = H_1^+ + (H_1^{+*}g_1)^*G1$$

For ease of the third iterative calculation, an intermediate parameter $U_2 = U_1 + (U_1^*g_1)^*G1$ may be calculated herein for preparation.

S407. Determine $n_2$ and $\alpha_2$.

The for loop may be used to substitute the M−1 numbers a in $S2_1$ into the formula $$|\alpha| = \frac{\sqrt{P}}{\|r(H^+, a)\|}$$

one by one, to obtain $[\alpha_2, a_2]=\text{argmin}(|\alpha|_{min})$. $n_2$ that is in $S1_1$ and that corresponds to $a_2$ in $S2_1$ is determined as a selected antenna index.

S408. Update the weight matrix.

A weight matrix $W_2=W_1+\alpha_2 H_2^+$ in the second iteration is calculated, where $W_2 \in C^{M-1 \times K}$.

An $(a_2)^{th}$ row (a row corresponding to $n_2$) in $W_2$ is assigned to a row that is in $W_{opt}$ ($W_{opt} \in C^{M \times K}$) and that corresponds to $n_2$ (that is, an $(n_1)^{th}$ row in $W_{opt}$). That is, $r(W_{opt}, n_2)=r(W_2, a_2)$.

S409. Obtain a column that is in $H_2$ and that corresponds to $n_2$ (that is, an $(a_2)^{th}$ column in $H_2$), that is, $g_2=c(H_2, a_2)$; delete a row that is in $W_2$ and that corresponds to $n_2$ (that is, an $(a_2)^{th}$ row in $W_2$), delete a row that is in $H_2^+$ and that corresponds to $n_2$ (that is, an $(a_2)^{th}$ row in $H_2^+$), and delete a column that is in $H_2$ and that corresponds to $n_2$ (that is, an $(a_2)^{th}$ column in $H_2$, to obtain $H_3$; delete $n_2$ from $S1_1$ to obtain $S1_2$, that is, $S1_2$ includes M−2 remaining antenna indexes other than $n_1$ and $n_2$; and update $S2_1$ to $S2_2=[1,\ldots,M-2]$. $1, 2, \ldots,$ and M−1 in $S2_1$ are in a one-to-one correspondence with the M−1 antenna indexes in $S1_1$.

For example, based on the foregoing example, $a_2=3$ is obtained through calculation in S407. Then, it corresponds to the antenna index 4 in $S1_1$. That is, $n_2=4$ is determined. Then, in S408, $r(W_{opt}, 4)=r(W_2, 3)$ is performed. In S409, $g_2=c(H_2, 3)$ a row that is in $W_2$ and that corresponds to the antenna index 4 (that is, a third row in $W_2$) is deleted, a row that is in $H_2^+$ and that corresponds to the antenna index 4 (that is, a third row in $H_2^+$) is deleted, and a column that is in $H_2$ and that corresponds to the antenna index 4 (that is, a third column in $H_2$) is deleted, to obtain $H_3$. 4 is deleted from $S1_1$ to obtain $S1_2$, that is, $S1_2$ includes three remaining antenna indexes other than 3 and 4. That is, $S1_2=[1,2,5]$. $S2_1$ is updated to $S2_2=[1,2,3]$. In this case, the number 1 in $S2_2$ corresponds to the antenna index 1 in $S1_2$, the number 2 in $S2_2$ corresponds to the antenna index 2 in $S1_2$, and the number 3 in $S2_2$ corresponds to the antenna index 5 in $S1_2$.

S410. Start the third iteration, and calculate $H_3^+$ of $H_3$:

$H_3^+$ is Calculated based on the formula (3) by using $H_2^+$. For example, after $H_2^+$ and $\beta_{n_2}$ (that is, $g_2$) are substituted into the formula (3), a simplified derivation process of the formula (3) is as follows:

$$D2 = g_2^{H*}U_2$$

$$G2 = \frac{D2}{1 - D2^*g_2}$$

$$H_3^+ = H_2^+ + (H_2^{+*}g_2)^*G2$$

S411. Determine $n_3$ and $\alpha_3$.

The for loop may be used to substitute the M−2 numbers a in $S2_2$ into the formula $$|\alpha| = \frac{\sqrt{P}}{\|r(H^+, a)\|}$$

one by one, to obtain $[\alpha_3, a_3]=\text{argmin}(|\alpha|_{min})$. $n_3$ that is in $S1_2$ and that corresponds to $a_3$ in $S2_2$ is determined as a selected antenna index.

S412. Update the weight matrix.

A weight matrix $W_3=W_2+\alpha_3 H_3^+$ in the third iteration is calculated, where $W_3 \in C^{M-2 \times K}$.

A row that is in $W_3$ and that corresponds to each n in $S1_2$ is assigned to a row that is in $W_{opt}$ ($W_{opt} \in C^{M \times K}$) and that corresponds to each n in $S1_2$. That is, $r(W_{opt}, S1_2)=r(W_3, S2_2)$.

S413. The iteration ends.

Based on the foregoing example, $a_3=2$ is obtained through calculation in S411. Then, it corresponds to the antenna index 2 in $S1_2$. That is, $n_3=2$ is determined. Then, in S412, $r(W_{opt}, S1_2)=r(W_3, S2_2)$ is performed, and based on a correspondence between $S2_2$ and $S1_2$, a first row in $W_3$ is assigned to a first row in $W_{opt}$, a second row in $W_3$ is assigned to a second row in $W_{opt}$, and a third row in $W_3$ is assigned to a fifth row in $W_{opt}$.

So far, the output $W_{opt}$ can adjust transmit powers of antennas with the antenna indexes 2, 3, and 4 in the M antennas of the network device to the maximum transmit power, and ensure that transmit powers of remaining antennas with the antenna indexes 1 and 5 are less than or equal to the maximum transmit power.

Figure 4:
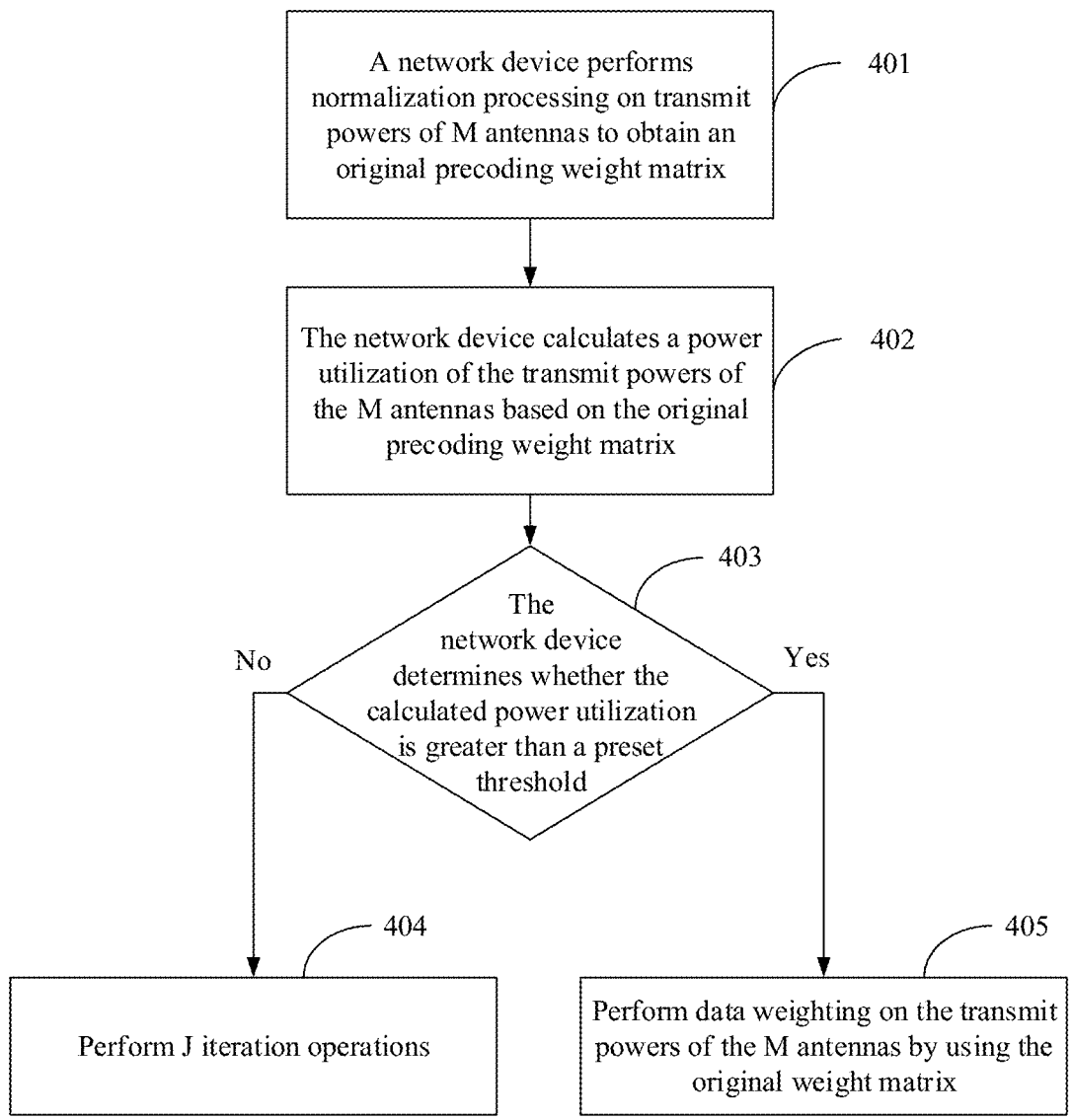
FIG. 4 is a flowchart 2 of another embodiment of a precoding method according to this application.

FIG. 4 is a flowchart of another embodiment of a precoding method according to this application. The method includes the following operations.

Step 401: The network device performs normalization processing on transmit powers of the M antennas to obtain an original precoding weight matrix.

For example, if the network device performs normalization processing on the transmit powers of the M antennas based on a conventional PEBF algorithm, the obtained original precoding weight matrix is a PEBF weight matrix.

Step 402: The network device calculates a power utilization of the transmit powers of the M antennas based on the original precoding weight matrix.

The network device calculates, based on the PEBF weight matrix, a sum of transmit powers finally used by the M antennas, and divides the sum by a sum (MP) of maximum transmit powers allowed to be used by the M antennas, to obtain the power utilization of the transmit powers of the M antennas.

For example, the power utilization η may be calculated by using the following formula (12):

$$\eta = \frac{\sum_{i=0}^{M-1} \sum_{j=0}^{N_{RB}-1} \sum_{k=0}^{N_{j,L}-1} |W_{i,j,k,PEBF}|^2}{MP} \quad (12)$$

where $W_{i,j,k,PEBF}$ represents a complex value of an $i^{th}$ antenna at a $k^{th}$ layer of PEBF weights of a $j^{th}$ RB, $N_{RB}$ represents a quantity of RBs, and $N_{j,L}$ represents a layer quantity of the $j^{th}$ RB.

Step 403: The network device determines whether the calculated power utilization is greater than a preset threshold THr.

Step 404: When η<THr, perform J iteration operations.

Step 405: When η≥THr, perform data weighting on the transmit powers of the M antennas by using the original weight matrix.

Figure 5:
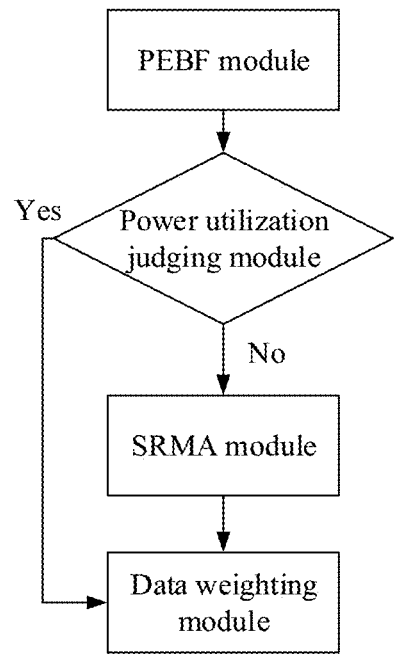
FIG. 5 is a schematic diagram of algorithm modules of a network device according to this application.

Based on the example, as shown in FIG. 5, algorithm modules of the network device may include a PEBF module, a power utilization judging module, a sum rate maximum algorithm (SRMA) module, and a data weighting module. The network device may first perform power normalization processing on the M antennas of the network device based on the PEBF module, to obtain a PEBF weight matrix. The PEBF module outputs the PEBF weight matrix to the power utilization judging module, and the power utilization judging module calculates and judges a power utilization. When the power utilization judging module determines that the calculated η is less than THr, a signal is output to the SRMA module, so that the SRMA module performs J iteration operations to obtain $W_{opt}$. Then, $W_{opt}$ is output to the data weighting module, so that the data weighting module performs data weighting on the transmit powers of the M antennas. When the power utilization judging module determines the calculated η is greater than or equal to THr, the PEBF weight matrix is directly output to the data weighting module, so that the data weighting module performs data weighting on the transmit powers of the M antennas.

It should be noted that a power utilization of antennas, a throughput of a cell, and a spectral efficiency gain of a system can be effectively improved by using the precoding provided in this application.

Figure 6:
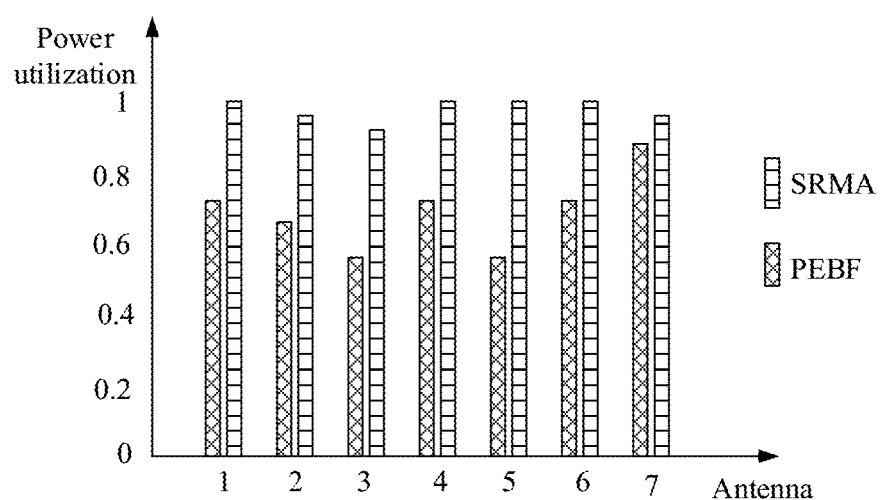
FIG. 6 is a schematic diagram of comparison between simulation effects of power utilizations according to this application.
Figure 7:
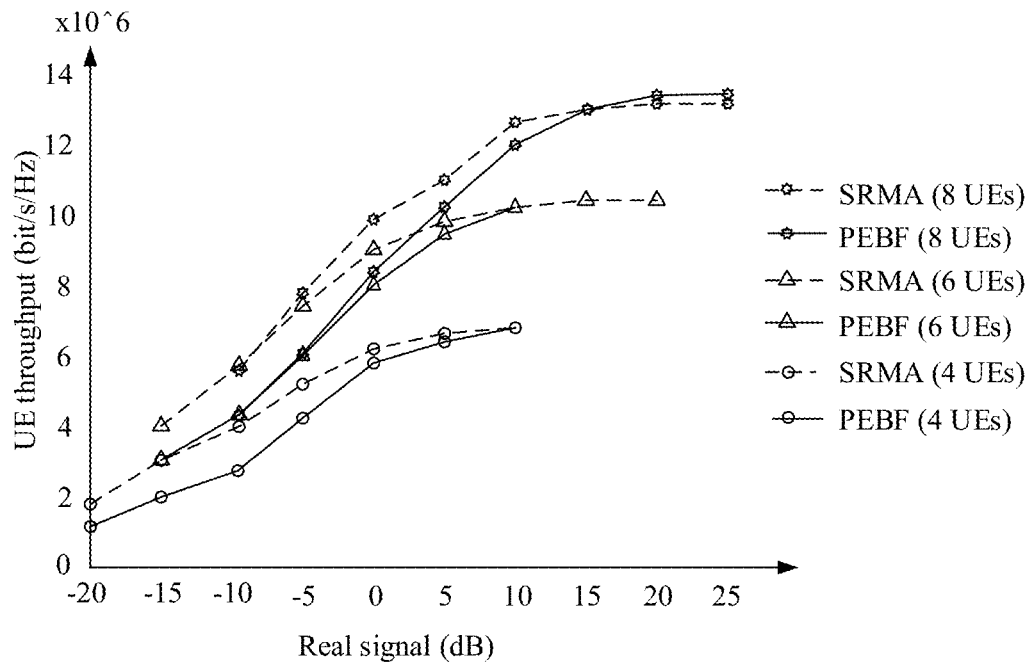
FIG. 7 is a schematic diagram of comparison between simulation effects of average cell throughputs according to this application.
Figure 8:
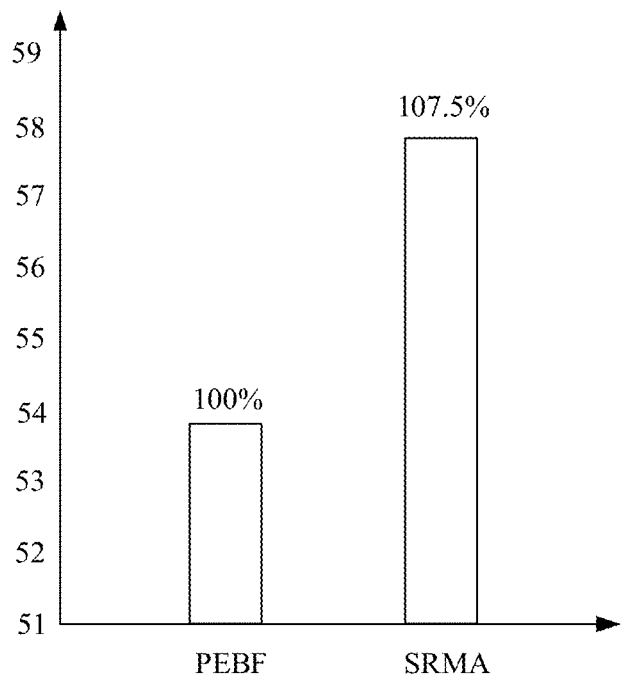
FIG. 8 is a schematic diagram of comparison between simulation effects of spectral efficiency gains according to this application.

For example, FIG. 6 to FIG. 8 are schematic diagrams of comparison between simulation effects of precoding performed by using the conventional PEBF algorithm and the precoding method (referred to as the SRMA algorithm below) provided in this application. FIG. 6 is a schematic diagram of comparison between simulation effects of power utilizations. It can be learned that when the conventional PEBF algorithm is used for precoding, a power utilization of the antennas is 71.6%. However, when the SRMA algorithm provided in this application is used for precoding, a power utilization of the antennas is 99.2%.

FIG. 7 is a schematic diagram of comparison between simulation effects of average cell throughputs obtained by using four user equipments (UEs), six UEs, and eight UEs as examples. It can be learned that, an average cell throughput obtained by performing precoding by using the SRMA algorithm provided in this application may be at least 20% higher than an average cell throughput obtained by performing precoding by using the conventional PEBF algorithm.

FIG. 8 is a schematic diagram of comparison between simulation effects of spectral efficiency gains. It can be learned that a spectral efficiency gain of the system after the SRMA algorithm provided in this application is used for precoding may be at least 7% higher than a spectral efficiency gain of the system after the conventional PEBF algorithm is used for precoding.

Figure 9:
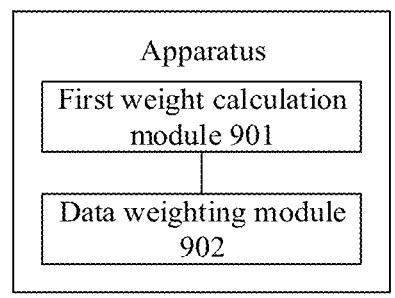
FIG. 9 is a schematic diagram 1 of a structure of an apparatus according to this application.

Referring to FIG. 9, an apparatus provided in this application includes a first weight calculation module 901 and a data weighting module 902.

The first weight calculation module 901 is configured to determine a generalized inverse matrix $H_m^+$ of a channel value matrix $H_m$ of K users in an $m^{th}$ iteration in J iteration operations, where m=1, 2, ..., and J, 1≤J≤M-K+1, J is an integer, and M is a quantity of antennas; select, from a set $S1_{m-1}$ based on $H_m^+$, an antenna index $n_m$ and an update coefficient $\alpha_m$ corresponding to $n_m$, where $S1_{m-1}$ is a set of n unselected in antenna indexes n of the M antennas until an $(m-1)^{th}$ iteration ends; determine a weight matrix $W_m$ based on $H_m^+$ and $\alpha_m$; and assign a row that is in $W_m$ and that corresponds to $n_m$ to a row that is in a final weight matrix $W_{opt}$ and that corresponds to $n_m$, where $W_{opt}$ is used by the data weighting module 902 to adjust transmit powers of at least J of the M antennas to a preset maximum transmit power P after the first weight calculation module 901 completes the J iteration operations.

In an embodiment, a product of $H_m$ and $W_m$ is a diagonal matrix or approximates to a diagonal matrix.

In an embodiment, that the first weight calculation module 901 determines a weight matrix $W_m$ based on $H_m^+$ and $\alpha_m$ includes: calculating $W_m$ by using a formula $W_m = W_{m-1} + \alpha_m H_m^+$, where $W_{m-1}$ is a weight matrix used in the $(m-1)^{th}$ iteration.

In an embodiment, when m is greater than 2, that the first weight calculation module 901 determines $H_m^+$ of $H_m$ of K users includes: calculating $H_m^+$ by using a formula $$H_m^+ = \left(H_{m-1} + \beta_{n_{m-1}} * \beta_{n_{m-1}}^H\right)^{-1} = H_{m-1}^+ - \frac{H_{m-1}^+ \beta_{n_{m-1}} * \beta_{n_{m-1}}^H H_{m-1}^+}{1 + \beta_{n_{m-1}}^H H_{m-1}^+ \beta_{n_{m-1}}},$$

where $H_{m-1}^+$ represents a generalized inverse matrix of a channel value matrix $H_{m-1}$ of the K users in the $(m-1)^{th}$ iteration, and $\beta_{n_m}1$ represents a column that is in $H_m$-1 and that corresponds to an antenna index $n_m$-1 selected in the $(m-1)^{th}$ iteration.

In an embodiment, that the first weight calculation module 901 determines $H_m^+$ of a channel value matrix $H_m$ includes: setting, to zero, a column that is in an initial channel value matrix H of the K users and that corresponds to an antenna index n selected until the $(m-1)^{th}$ iteration ends, to obtain $H_m$; calculating $H_m^+$ based on $H_m$.

In an embodiment, that the first weight calculation module 901 selects, from a set $S1_m$-1 based on $H_m$, $n_m$ and an update coefficient $\alpha_m$ corresponding to $n_m$ includes: substituting M−m+1 n in $S1_m$-1 into a formula one by one:

$$\alpha = \frac{-\text{real}(r(H_m^+, n) * r(W_{m-1}, n)^H) + \sqrt{\text{real}(r(H_m^+, n) * r(W_{m-1}, n)^H)^2 - \|r(H_m^+, n)\|^2(\|r(W_{m-1}, n)\|^2 -)P)}}{\|r(H_m^+, n)\|^2}$$

and/or $$\alpha = \frac{-\text{real}(r(H_m^+, n) * r(W_{m-1}, n)^H) - \sqrt{\text{real}(r(H_m^+, n) * r(W_{m-1}, n)^H)^2 - \|r(H_m^+, n)\|^2(\|r(W_{m-1}, n)\|^2 -)P)}}{\|r(H_m^+, n)\|^2};$$

and determining n making a smallest $|\alpha|$ as an antenna index $n_m$ selected in the $m^{th}$ iteration process, and determining the smallest $|\alpha|$ as $\alpha_m$.

In an embodiment, when m=J, that the first weight calculation module 901 assigns a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S1_{M-J+1})$.

In an embodiment, the first weight calculation module 901 is further configured to: after the row that is in $W_m$ and that corresponds to $n_m$ is assigned to the $(n_m)^{th}$ row in the final weight matrix $W_{opt}$, delete rows that are in $W_m$ and $H_m^+$ and that correspond to $n_m$; and delete a column that is in $H_m$ and that corresponds to $n_m$.

In an embodiment, a set $S2_m$-1 is set, M−m+1 numbers a in $S2_m$-1 are in a one-to-one correspondence with M−m+1 n in $S1_m$-1, and that the first weight calculation module 901 selects, from a set $S1_m$-1 based on $H_m$, $n_m$ and an update coefficient $\alpha_m$ corresponding to $n_m$ includes:

substituting the M−m+1 numbers a in the set $S2_m$-1 into a formula one by one:

$$\alpha = \frac{-\text{real}(r(H_m^+, a) * r(W_{m-1}, a)^H) + \sqrt{\text{real}(r(H_m^+, a) * r(W_{m-1}, a)^H)^2 - \|r(H_m^+, a)\|^2(\|r(W_{m-1}, a)\|^2 -)P)}}{\|r(H_m^+, a)\|^2}$$

and/or $$\alpha = \frac{-\text{real}(r(H_m^+, a) * r(W_{m-1}, a)^H) - \sqrt{\text{real}(r(H_m^+, a) * r(W_{m-1}, a)^H)^2 - \|r(H_m^+, a)\|^2(\|r(W_{m-1}, a)\|^2 -)P)}}{\|r(H_m^+, a)\|^2};$$

and determining n that is in $S1_m$-1 and that corresponding to a making a smallest $|\alpha|$ as an antenna index $n_m$ selected in the $m^{th}$ iteration process, and determining the smallest $|\alpha|$ as $\alpha_m$.

In an embodiment, when m=J, that the first weight calculation module 901 assigns a row that is in $W_m$ and that corresponds to $n_m$ to a row that is in a final weight matrix $W_{opt}$ and that corresponds to $n_m$ includes: $r(W_{opt}, S1_{M-J+1}) = r(W_J, S2_{M-J+1})$.

Figure 10:
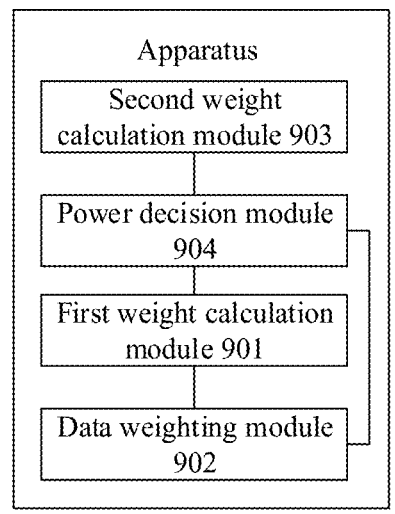
FIG. 10 is a schematic diagram 2 of a structure of an apparatus according to this application.

In an embodiment, as shown in FIG. 10, the apparatus further includes a second weight calculation module 903 and a power decision module 904. The second weight calculation module 903 is configured to: before the first weight calculation module 901 performs the J iteration operations, perform normalization processing on transmit powers of the M antennas to obtain an original precoding weight matrix. The power decision module 904 is configured to calculate a power utilization of the transmit powers of the M antennas based on the original precoding weight matrix calculated by the second weight calculation module 903. The first weight calculation module 901 is configured to: when the power utilization calculated by the power decision module 904 is less than a preset threshold, perform the J iteration operations.

The apparatus may be the network device in the embodiments of this application, for example, may be the network device shown in FIG. 1. The first weight calculation module 901, the data weighting module 902, the second weight calculation module 903, and the power decision module 904 may be integrated into the processor 101 shown in FIG. 1. The memory 102 shown in FIG. 1 may store computer execution instructions of the precoding method provided in this application. The processor 101 completes the J iteration operations by executing the computer execution instructions, and uses the obtained $W_{opt}$ to adjust transmit powers of the M antennas of the network device. The transceiver 103 may then be controlled to transmit a signal by using an adjusted transmit power.

Alternatively, the apparatus may be a chip in the network device in the embodiments of this application. The first weight calculation module 901, the data weighting module 902, the second weight calculation module 903, and the power decision module 904 may be integrated into a processor in the chip.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

In an embodiment, the computer-readable medium may include a RAM, a ROM, an EEPROM, a CD-ROM or another optical disc storage, a magnetic disk storage or another magnetic storage device, or any other medium that can be configured to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a special-purpose computer, a computer network, a network device, user equipment, or another programmable apparatus.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A precoding method, comprising:
    determining a generalized inverse matrix $H_m^+$ of a channel value matrix $H_m$ of K users in an $m^{th}$ iteration in J iteration operations, wherein m=1, 2, . . . , and J, $1 \le J \le M-K+1$, J is an integer, and M is a quantity of antennas;
    selecting, from a set $S1_{m\_}1$ based on $H_m^+$, an antenna index $n_m$ and an update coefficient $\alpha_m$ corresponding to $n_m$, wherein $S1_{m\_}1$ is a set of columns that are unselected in antenna indexes of the M antennas until an $(m-1)^{th}$ iteration ends;
    determining a weight matrix $W_m$ based on $H_m^+$ and $\alpha_m$; and
    assigning a row that is in $W_m$ and that corresponds to $n_m$ to a row that is in a final weight matrix $W_{opt}$ and that corresponds to $n_m$, wherein $W_{opt}$ is to adjust transmit powers of at least J of the M antennas to a preset transmit power P after the J iteration operations end.

2. The method according to claim 1, wherein a product of $H_m$ and $W_m$ is a diagonal matrix.

3. The method according to claim 1, wherein the determining of the weight matrix $W_m$ based on $H_m^+$ and $\alpha_m$ comprises:
    calculating $W_m$ by using a formula $W_m = W_{m\_}1 + \alpha_m H_m^+$, wherein $W_{m\_}1$ is a weight matrix used in the $(m-1)^{th}$ iteration.

4. The method according to claim 1, wherein when m is greater than 2, the determining of the generalized inverse matrix $H_m^+$ of the channel value matrix $H_m$ of the K users comprises:
    calculating $H_m^+$ by using a formula $$H_m^+ = (H_{m-1} + \beta_{n_{m-1}} * \beta_{n_{m-1}}^H)^{-1} = H_{m-1}^+ - \frac{H_{m-1}^+ \beta_{n_{m-1}} * \beta_{n_{m-1}}^H H_{m-1}^+}{1 + \beta_{n_{m-1}}^H H_{m-1}^+ \beta_{n_{m-1}}},$$

wherein $H_{m\_}1^+$ represents a generalized inverse matrix of a channel value matrix $H_{m\_}1$ of the K users in the $(m-1)^{th}$ iteration, and $\beta_{n_{m\_}}1$ represents a column that is in $H_{m\_}1$ and that corresponds to an antenna index $n_{m\_}1$ selected in the $(m-1)^{th}$ iteration.

5. The method according to claim 1, wherein the determining of the generalized inverse matrix $H_m^+$ of the channel value matrix $H_m$ comprises:
    setting, to zero, a column that is in an initial channel value matrix H of the K users and that corresponds to an antenna index column selected until the $(m-1)^{th}$ iteration ends, to obtain $H_m$; and
    calculating $H_m^+$ based on $H_m$.

6. The method according to claim 1, wherein the selecting of $n_m$ and the update coefficient $\alpha_m$ corresponding to $n_m$ comprises:
    substituting M−m+1 n in $S1_{m\_}1$ into a formula one by one:

$$\alpha = \frac{-\text{real}(r(H_m^+, n) * r(W_{m-1}, n)^H) + \sqrt{\text{real}(r(H_m^+, n) * r(W_{m-1}, n)^H)^2 - \|r(H_m^+, n)\|^2 (\|r(W_{m-1}, n)\|^2 - P)}}{\|r(H_m^+, n)\|^2}$$

and/or $$\alpha = \frac{-\text{real}(r(H_m^+, n) * r(W_{m-1}, n)^H) - \sqrt{\text{real}(r(H_m^+, n) * r(W_{m-1}, n)^H)^2 - \|r(H_m^+, n)\|^2 (\|r(W_{m-1}, n)\|^2 - P)}}{\|r(H_m^+, n)\|^2};$$

and
    determining a column making a smallest $|\alpha|$ as an antenna index $n_m$ selected in the $m^{th}$ iteration process, and determining the smallest $|\alpha|$ as $\alpha_m$.

7. The method according to claim 1, wherein when m=J, the assigning of the row that is in $W_m$ and that corresponds to $n_m$ to the row that is in the final weight matrix $W_{opt}$ and that corresponds to $n_m$ comprises:
    $r(W_{opt}, S1_{M\_J+1}) = r(W_J, S1_{M\_J+1})$.

8. The method according to claim 1, wherein after the row that is in $W_m$ and that corresponds to $n_m$ is assigned to the $(n_m)^{th}$ row in the final weight matrix $W_{opt}$, the method further comprises:
    deleting rows that are in $W_m$ and $H_m^+$ and that correspond to $n_m$; and
    deleting a column that is in $H_m$ and that corresponds to $n_m$.

9. The method according to claim 8, further comprising:
    setting a set $S2_{m\_}1$, wherein the set $S2_{m\_}1$ includes M−m+1 numbers a that are in a one-to-one correspondence with M−m+1 n in $S1_{m\_}1$; and
    wherein the selecting, from the set $S1_{m\_}1$ based on $H_m$, of $n_m$ and the update coefficient $\alpha_m$ corresponding to $n_m$ comprises:
    substituting the M−m+1 numbers a in the set $S2_{m\_}1$ into a formula one by one:

$$\alpha = \frac{-\text{real}(r(H_m^+, a) * r(W_{m-1}, a)^H) + \sqrt{\text{real}(r(H_m^+, a) * r(W_{m-1}, a)^H)^2 - \|r(H_m^+, a)\|^2 (\|r(W_{m-1}, a)\|^2 - )P}}{\|r(H_m^+, a)\|^2}$$

and/or $$\alpha = \frac{-\text{real}(r(H_m^+, a) * r(W_{m-1}, a)^H) - \sqrt{\text{real}(r(H_m^+, a) * r(W_{m-1}, a)^H)^2 - \|r(H_m^+, a)\|^2(\|r(W_{m-1}, a)\|^2 -)P}}{\|r(H_m^+, a)\|^2};$$

and determining n that is in $S1_{m-1}$ and that corresponds to a making a smallest $|\alpha|$ as an antenna index $n_m$ selected in the $m^{th}$ iteration process, and determining the smallest $|\alpha|$ as $\alpha_m$.

10. The method according to claim 9, wherein when m=J, the assigning of the row that is in $W_m$ and that corresponds to $n_m$ to the row that is in a final weight matrix $W_{opt}$ and that corresponds to $n_m$ comprises:

$$r(W_{opt}, S1_{M-J+1}) = r(W_J, S2_{M-J+1}).$$

11. The method according to claim 1, wherein before the J iteration operations are performed, the method further comprises:

performing normalization processing on transmit powers of the M antennas to obtain an original precoding weight matrix;
calculating a power utilization of the transmit powers of the M antennas based on the original precoding weight matrix; and
when the power utilization is less than a preset threshold, performing the J iteration operations.

12. An apparatus, comprising:
a processor;
a memory coupled to the processor, and storing program instructions, which, when executed, cause the processor to perform operations comprising:
determining a generalized inverse matrix $H_m^+$ of a channel value matrix $H_m$ of K users in an $m^{th}$ iteration in J iteration operations, wherein m=1, 2, . . . , and J, $1 \leq J \leq M-K+1$, J is an integer, and M is a quantity of antennas;
selecting, from a set $S1_{m-1}$ based on $H_m^+$, an antenna index $n_m$ and an update coefficient $\alpha_m$ corresponding to $n_m$, wherein $S1_{m-1}$ is a set of columns that are unselected in antenna indexes of the M antennas until an $(m-1)^{th}$ iteration ends;
determining a weight matrix $W_m$ based on $H_m^+$ and $\alpha_m$; and
assigning a row that is in $W_m$ and that corresponds to $n_m$ to a row that is in a final weight matrix $W_{opt}$ and that corresponds to $n_m$, wherein $W_{opt}$ is used to adjust transmit powers of at least J of the M antennas to a preset transmit power P after completing the J iteration operations.

13. The apparatus according to claim 12, wherein a product of $H_m$ and $W_m$ is a diagonal matrix.

14. The apparatus according to claim 12, wherein the determining of the weight matrix $W_m$ based on $H_m^+$ and $\alpha_m$ comprises:
calculating $W_m$ by using a formula $W_m = W_{m-1} + \alpha_m H_m^+$, wherein $W_{m-1}$ is a weight matrix used in the $(m-1)^{th}$ iteration.

15. The apparatus according to claim 12, wherein when m is greater than 2, the determining of $H_m^+$ of $H_m$ of the K users comprises:

calculating $H_m^+$ by using a formula $$H_m^+ = (H_{m-1} + \beta_{n_{m-1}} * \beta_{n_{m-1}}^H)^{-1} = H_{m-1}^+ - \frac{H_{m-1}^+ \beta_{n_{m-1}} * \beta_{n_{m-1}}^H H_{m-1}^+}{1 + \beta_{n_{m-1}}^H H_{m-1}^+ \beta_{n_{m-1}}},$$

wherein $H_{m-1}^+$ represents a generalized inverse matrix of a channel value matrix $H_{m-1}$ of the K users in the $(m-1)^{th}$ iteration, and $\beta_{n_{m-1}}$ represents a column that is in $H_{m-1}$ and that corresponds to an antenna index $n_{m-1}$ selected in the $(m-1)^{th}$ iteration.

16. The apparatus according to claim 12, wherein the determining of $H_m^+$ of a channel value matrix $H_m$ comprises:
setting, to zero, a column that is in an initial channel value matrix H of the K users and that corresponds to an antenna index n selected until the $(m-1)^{th}$ iteration ends, to obtain $H_m$; and
calculating $H_m^+$ based on $H_m$.

17. The apparatus according to claim 12, wherein the selecting, of $n_m$ and the update coefficient $\alpha_m$ corresponding to $n_m$ comprises:
substituting M−m+1 n in $S1_{m-1}$ into a formula one by one:

$$\alpha = \frac{-\text{real}(r(H_m^+, n) * r(W_{m-1}, n)^H) + \sqrt{\text{real}(r(H_m^+, n) * r(W_{m-1}, n)^H)^2 - \|r(H_m^+, n)\|^2(\|r(W_{m-1}, n)\|^2 -)P}}{\|r(H_m^+, n)\|^2}$$

and/or $$\alpha = \frac{-\text{real}(r(H_m^+, n) * r(W_{m-1}, n)^H) - \sqrt{\text{real}(r(H_m^+, n) * r(W_{m-1}, n)^H)^2 - \|r(H_m^+, n)\|^2(\|r(W_{m-1}, n)\|^2 -)P}}{\|r(H_m^+, n)\|^2};$$

and determining n making a smallest $|\alpha|$ as an antenna index $n_m$ selected in the $m^{th}$ iteration process, and determining the smallest $|\alpha|$ as $\alpha_m$.

18. The apparatus according to claim 12, wherein when m=J, the assigning of the row that is in $W_m$ and that corresponds to $n_m$ to the row that is in a final weight matrix $W_{opt}$ and that corresponds to $n_m$ comprises:

$$r(W_{opt}, S1_{M-J+1}) = r(W_J, S1_{M-J+1}).$$

19. The apparatus according to claim 12, the operations further comprising: after the row that is in $W_m$ and that corresponds to $n_m$ is assigned to the $(n_m)^{th}$ row in the final weight matrix $W_{opt}$, deleting rows that are in $W_m$ and $H_m^+$ and that correspond to $n_m$; and delete a column that is in $H_m$ and that corresponds to $n_m$.

20. The apparatus according to claim 19, the operations further comprising:
setting a set $S2_{m-1}$, wherein the set $S2_{m-1}$ includes M−m+1 numbers a that are in a one-to-one correspondence with M−m+1 n in $S1_{m-1}$;
wherein the selecting, from a set $S1_{m-1}$ based on $H_m$, of $n_m$ and the update coefficient $\alpha_m$ corresponding to $n_m$ comprises:
substituting the M−m+1 numbers a in the set $S2_{m-1}$ into a formula one by one:

$$\alpha = \frac{-\text{real}(r(H_m^+, a) * r(W_{m-1}, a)^H) + \sqrt{\text{real}(r(H_m^+, a) * r(W_{m-1}, a)^H)^2 - \|r(H_m^+, a)\|^2(\|r(W_{m-1}, a)\|^2 -)P}}{\|r(H_m^+, a)\|^2}$$

-continued and/or $$\alpha = \frac{-\text{real}(r(H_m^+, a) * r(W_{m-1}, a)^H) - \sqrt{\text{real}(r(H_m^+, a) * r(W_{m-1}, a)^H)^2 - \|r(H_m^+, a)\|^2(\|r(W_{m-1}, a)\|^2 -)P)}}{\|r(H_m^+, a)\|^2};$$

and determining n that is in $S1_m$-1 and that corresponds to a making a smallest $|\alpha|$ as an antenna index $n_m$ selected in the $m^{th}$ iteration process, and determining the smallest $|\alpha|$ as $\alpha_m$.

* * * * *